United States Patent
Stoerk

(10) Patent No.: US 10,358,006 B2
(45) Date of Patent: Jul. 23, 2019

(54) AXLE SUPPORT FOR A VEHICLE

(71) Applicant: Bayerische Motoren Werke Aktiengesellschaft, Munich (DE)

(72) Inventor: Kai-Uwe Stoerk, Wessling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/683,985

(22) Filed: Aug. 23, 2017

(65) Prior Publication Data

US 2017/0349018 A1    Dec. 7, 2017

Related U.S. Application Data

(63) Continuation of application No. PCT/EP2016/054400, filed on Mar. 2, 2016.

(30) Foreign Application Priority Data

Apr. 23, 2015   (DE) .................. 10 2015 207 402

(51) Int. Cl.
*B60G 3/20* (2006.01)
*B62D 21/11* (2006.01)

(52) U.S. Cl.
CPC ............. *B60G 3/20* (2013.01); *B62D 21/11* (2013.01); *B60G 2200/18* (2013.01); *B60G 2204/15* (2013.01)

(58) Field of Classification Search
CPC ................. B60G 3/20; B62D 21/11
See application file for complete search history.

(56) References Cited

U.S. PATENT DOCUMENTS

| 7,584,815 B2 * | 9/2009 | Ogawa | B60G 3/20 180/312 |
| 8,818,700 B2 * | 8/2014 | Moulene | G05D 1/0891 180/199 |
| 8,851,484 B2 * | 10/2014 | Dantzie | B60G 3/14 180/65.51 |
| 9,004,220 B2 * | 4/2015 | Kawaguchi | B60K 1/00 180/443 |

(Continued)

FOREIGN PATENT DOCUMENTS

| CN | 103687779 A | 3/2014 |
| CN | 203902672 U | 10/2014 |

(Continued)

OTHER PUBLICATIONS

International Search Report (PCT/ISA/210) issued in PCT Application No. PCT/EP2016/054400 dated Jun. 15, 2016 with English translation (Six (6) pages).

(Continued)

*Primary Examiner* — Nicole T Verley
(74) *Attorney, Agent, or Firm* — Crowell & Moring LLP

(57) ABSTRACT

An axle support for a vehicle has a left longitudinal member for fastening a left wheel suspension, a right longitudinal member for fastening a right wheel suspension, and at least one cross member connecting the longitudinal members. The cross member is formed by two shells placed on top of each other. The two shells are detachably interconnected in a non-destructive manner. At least one component of an axle steering system is installed in the hollow space between the two shells.

13 Claims, 3 Drawing Sheets

(56) References Cited

U.S. PATENT DOCUMENTS

| | | | | |
|---|---|---|---|---|
| 9,120,506 B2* | 9/2015 | Isakiewitsch | | B62D 21/11 |
| 9,216,775 B2* | 12/2015 | Ohhama | | B62D 21/11 |
| 9,238,394 B2* | 1/2016 | Leibl | | B60G 3/20 |
| 9,469,344 B2* | 10/2016 | Haselhorst | | B62D 21/11 |
| 9,616,724 B2* | 4/2017 | Ariga | | B60G 7/001 |
| 9,616,933 B2* | 4/2017 | Tanaka | | B62D 21/155 |
| 9,682,727 B2* | 6/2017 | Tanaka | | B62D 21/11 |
| 9,707,813 B2* | 7/2017 | Randle | | B60G 3/20 |
| 9,783,234 B2* | 10/2017 | Tanaka | | B62D 21/11 |
| 9,895,949 B2* | 2/2018 | Lu | | B60F 3/003 |
| 2003/0107200 A1* | 6/2003 | Huang | | B60G 7/02 |
| | | | | 280/93.515 |
| 2005/0116434 A1 | 6/2005 | Kim et al. | | |
| 2006/0012162 A1 | 1/2006 | Werner et al. | | |
| 2011/0062677 A1 | 3/2011 | Kudla et al. | | |
| 2012/0139204 A1* | 6/2012 | Jung | | B60G 21/0551 |
| | | | | 280/124.106 |
| 2014/0117654 A1 | 5/2014 | Buschjohann et al. | | |
| 2015/0166104 A1 | 6/2015 | Ohhama et al. | | |
| 2016/0194029 A1 | 7/2016 | Kramer et al. | | |
| 2017/0203628 A1* | 7/2017 | Dames | | B60G 17/0165 |

FOREIGN PATENT DOCUMENTS

| | | |
|---|---|---|
| DE | 100 58 113 A1 | 6/2002 |
| DE | 101 07 960 A1 | 8/2002 |
| DE | 103 52 078 A1 | 6/2005 |
| DE | 603 05 517 T2 | 4/2007 |
| DE | 10 2006 058 993 A1 | 6/2008 |
| DE | 10 2011 052 216 A1 | 6/2012 |
| DE | 10 2012 005 561 A1 | 8/2013 |
| DE | 10 2012 023 633 A1 | 6/2014 |
| DE | 10 2013 013 325 A1 | 2/2015 |
| EP | 0 987 166 A1 | 3/2000 |
| EP | 1 253 028 A2 | 10/2002 |
| EP | 1 686 042 A1 | 8/2006 |
| WO | WO 2007/080281 A1 | 7/2007 |
| WO | WO 2014/017260 A1 | 1/2014 |

OTHER PUBLICATIONS

German-language Written Opinion (PCT/ISA/237) issued in PCT Application No. PCT/EP2016/054400 dated Jun. 15, 2016 (Five (5) pages).

German-language Search Report issued in counterpart German Application No. 10 2015 207 402.1 dated Nov. 10, 2015 with partial English translation (Eleven (11) pages).

Cover page of EP 1 966 029 A1 published Sep. 10, 2008 (One (1) page).

Chinese-language Office Action issued in counterpart Chinese Application No. 201680007620.5 dated Sep. 5, 2018 with English translation (nine pages).

German-language European Office Action issued in counterpart European Application No. 16 707 737.9 dated Nov. 21, 2018 (eight pages).

Chinese-language Office Action issued in counterpart Chinese Application No. 201680007620.5 dated Apr. 29, 2019 with English translation (12 pages).

* cited by examiner

AXLE SUPPORT FOR A VEHICLE

CROSS REFERENCE TO RELATED APPLICATIONS

This application is a continuation of PCT International Application No. PCT/EP2016/054400, filed Mar. 2, 2016, which claims priority under 35 U.S.C. § 119 from German Patent Application No. 10 2015 207 402.1, filed Apr. 23, 2015, the entire disclosures of which are herein expressly incorporated by reference.

BACKGROUND AND SUMMARY OF THE INVENTION

The present invention relates to an axle support for a vehicle, in particular for a vehicle having an electric drive. With respect to the prior art, reference is made by way of example to EP1253028 and, in particular, to DE102012005561.

FIG. 1 shows (with the exception of the parts having the designations 12 and 14) a conventional axle support. The conventional axle support has two longitudinal carriers 2, 3, to which in each case one wheel suspension system 4 is fastened. The two longitudinal carriers 2, 3 are connected to one another via crossmembers 107, 108. A holding device 9 extends parallel to the crossmembers 107, 108, on which holding device 9 a constituent part 10 of an axle regulating system (here, an actuator of a rear axle steering system) is fastened.

It is known, furthermore, that vehicle axle supports are of hollow or shell-shaped construction, inter alia, for saving material and therefore vehicle weight or for reasons of optimized stiffness and strength.

For instance, DE102012005561A1 which is mentioned above, describes a subframe in a vehicle. The subframe has in each case two crossmembers and longitudinal carriers. Here, two crossmembers which are constructed by way of, in each case, two shell elements are illustrated, which crossmembers in each case have a hollow construction as a result of the connection of the two shell elements. Inter alia, improvements in the stiffness and strength properties of the subframe are to be achieved by way of a hollow or shell-shaped construction of this type of the crossmembers.

Furthermore, EP1253028 describes a vehicle axle support or a link of a motor vehicle suspension system, which vehicle axle support or link has a free interior space, that is to say a cavity, in its cross section at least in sections. This cavity is utilized to accommodate hydraulic lines in a protected manner. It can be avoided here that the lines are damaged by environmental effects, such as by stone chipping.

In addition to the protection of vehicle components and an optimum design of vehicle parts with regard to stiffness and strength requirements, an optimum installation space design plays a role which is becoming more and more important. As the number of vehicle constituent parts rises as a result of added electronics or the like, the complexity of the vehicle components and their accommodation in the vehicle itself likewise increases. Thus, for example, the conventional axle supports which are illustrated in the prior art leave a relatively small amount of installation space free for the integration of added vehicle constituent parts, such as an electric drive, into the axle support.

It is an object of the present invention to provide an axle support which ensures both an improvement with regard to stiffness and strength requirements and an optimum utilization of installation space in the vehicle, by way of a structure of hollow configuration.

This and other objects are achieved by an axle support for a vehicle. The vehicle is, in particular, a two-track motor vehicle. The axle support is particularly preferably used in conjunction with an electrically driven vehicle. The axle support has a left-hand longitudinal carrier for fastening a left-hand wheel suspension system, and a right-hand longitudinal carrier for fastening a right-hand wheel suspension system. Furthermore, at least one cross member which connects the two longitudinal carriers is provided for transmitting chassis loads. It is provided within the context of the invention that the cross member is formed by way of two shells which are placed onto one another. The two shells are connected to one another such that they can be released without destruction. A cavity remains between the two shells of the cross member, which cavity can be utilized for further constituent parts of the vehicle, in particular for constituent parts of an axle steering system. This results overall in a design of the axle support which is optimized in terms of installation space. On account of the connection between the two shells which can be released without destruction, both simple initial assembly and later maintenance of the constituent parts of an axle steering system which are situated in the cavity are possible. Here, "can be released without destruction" is to be understood to mean, in particular, every connection which is not integrally joined. The two shells are therefore not connected to one another, in particular, by way of welding, brazing or adhesive bonding. A riveted connection is possible here, since said riveted connection can be released merely by way of destruction of the rivet, the two shells remaining completely un-destroyed in the process. In particular, a screw connection between the two shells will be selected here. One of the two shells can also be of flat configuration and therefore have the shape of a cover. It is merely decisive that a cavity which can be utilized remains on account of the construction of the cross member according to the invention.

The axle support particularly preferably includes at least one constituent part of an axle steering system. Specifically, the constituent part is installed according to the invention in the cavity between the two shells. The axle steering system is particularly preferably a rear axle steering system. Here, the constituent part which is integrated into the cavity is particularly preferably an electric, pneumatic or hydraulic actuator of the axle steering system which, as is customary, is configured as an Ackerman steering system. The actuator is advantageously connected via a corresponding linkage to the wheel suspension system, more precisely to its wheel support.

In addition to constituent parts of an axle steering system, an electronic power system can also be accommodated in the cavity, for example.

The axle support advantageously includes a holding device which is connected on both sides to the longitudinal carriers. The holding device extends through the cavity between the two shells of the cross member. The constituent part of the axle steering system is advantageously fastened to the holding device. Direct fastening of the constituent part of the axle steering system to the shells therefore does not take place, with the result that assembly and dismantling are facilitated here.

It is preferably provided that one of the two shells is fixedly connected directly to the two longitudinal carriers. As an alternative, the two shells can also be connected by way of their respective ends directly to the two longitudinal carriers. This results in a very stiff structure.

The cross member has an overall length. The overall length corresponds substantially to the spacing of the two longitudinal carriers. Each of the two shells preferably extends over at least 80%, preferably 100%, of the overall length. Here, at least one of the two shells has to extend over 100% of the overall length.

It is preferably provided, furthermore, that no wheel control components, for example links, are fastened to one of the two shells, preferably to the lower shell. This achieves a situation where the tolerance effects with regard to the axle support-side attachment points of the wheel control components are reduced to a magnitude which is known in the prior art. Furthermore, this results in decisive advantages during the assembly and dismantling. Even before the second shell is attached, all the wheel control components can be fastened to the construction comprising the two longitudinal carriers and the at least one shell of the at least one cross member. During servicing, merely the lower shell can be dismantled, without it being necessary here to dismantle wheel control components. Very simple and rapid access to the component in the cavity is possible as a result.

The axle support advantageously includes a further cross member and a plate-shaped shear area. The plate-shaped shear area is connected to the two cross members, it being provided that the shear area is connected to the further cross member such that it can be released without destruction. On the side of the two-shell cross member, the shear area is connected merely to one of the two shells. This shell therefore forms a unit together with the shear area, which unit can be dismantled, for example by way of bolts being released.

The axle support advantageously includes an electric machine for driving the vehicle. The electric machine is arranged between the two longitudinal carriers. If two cross members are used, the electric machine is advantageously arranged between the two cross members. Simple access to the electric machine is always possible from below by way of the one shell with the shear area being dismantled.

Moreover, the two-shell construction of the cross member makes the use of different materials possible. It is provided, in particular, that the lower shell which is connected to the shear area is manufactured from fiber reinforced plastic.

Other objects, advantages and novel features of the present invention will become apparent from the following detailed description of one or more preferred embodiments when considered in conjunction with the accompanying drawings.

DETAILED DESCRIPTION OF THE DRAWINGS

The axle support according to the invention includes two longitudinal carriers 2, 3. In each case one wheel suspension system 4 is arranged on the two longitudinal carriers 2, 3. In the wheel suspension system 4, the respective wheel support is connected via wheel control components (links) to the longitudinal carriers 2, 3.

A plurality of vehicle body attachment points 6 are configured on the longitudinal carriers 2, 3. These vehicle body attachment points 6 serve to fasten the axle support 1 to a vehicle body of the corresponding vehicle.

Figure 1:
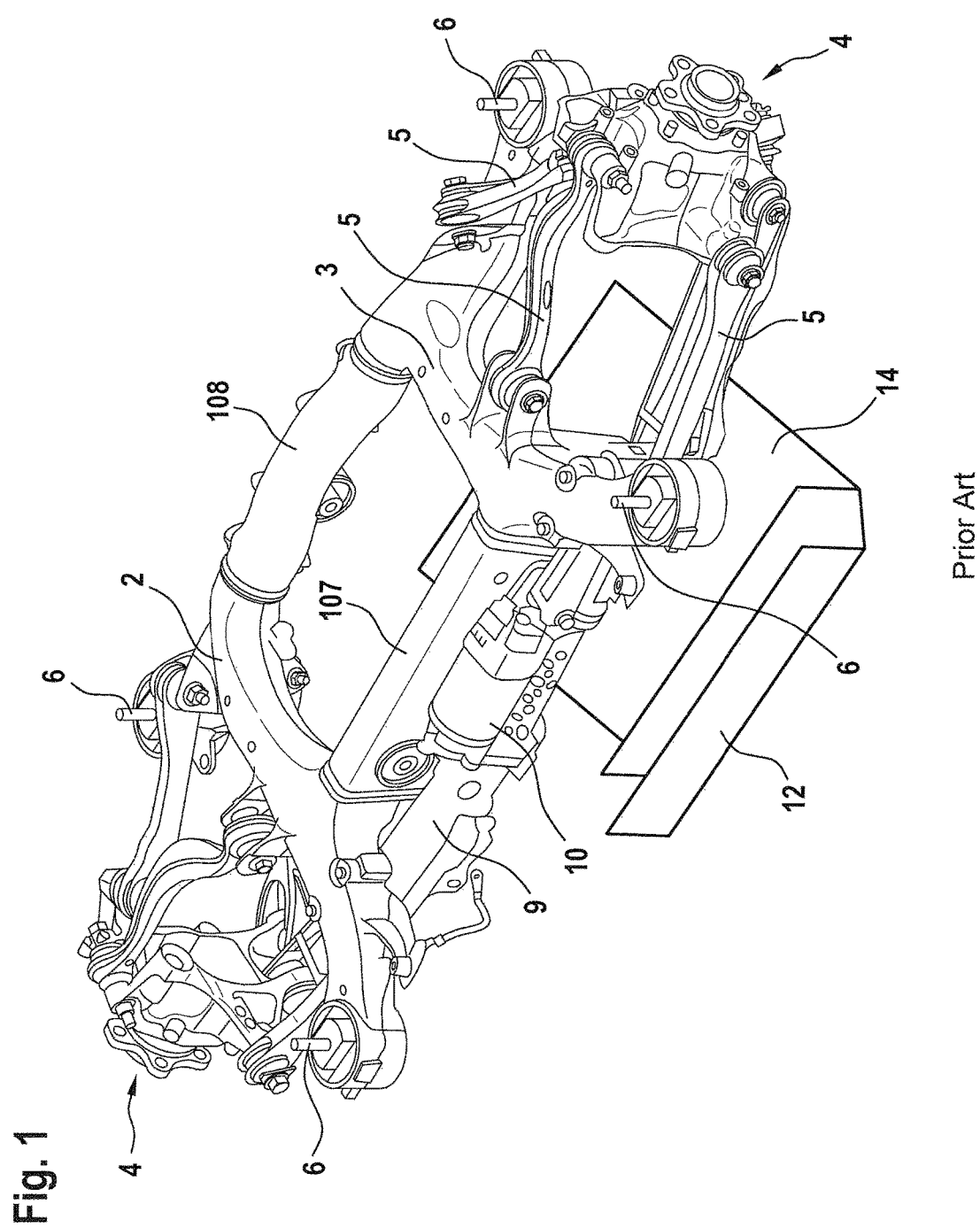
FIG. 1 shows an axle support in accordance with the prior art, along with a diagrammatic outline of the invention.
Figure 2:
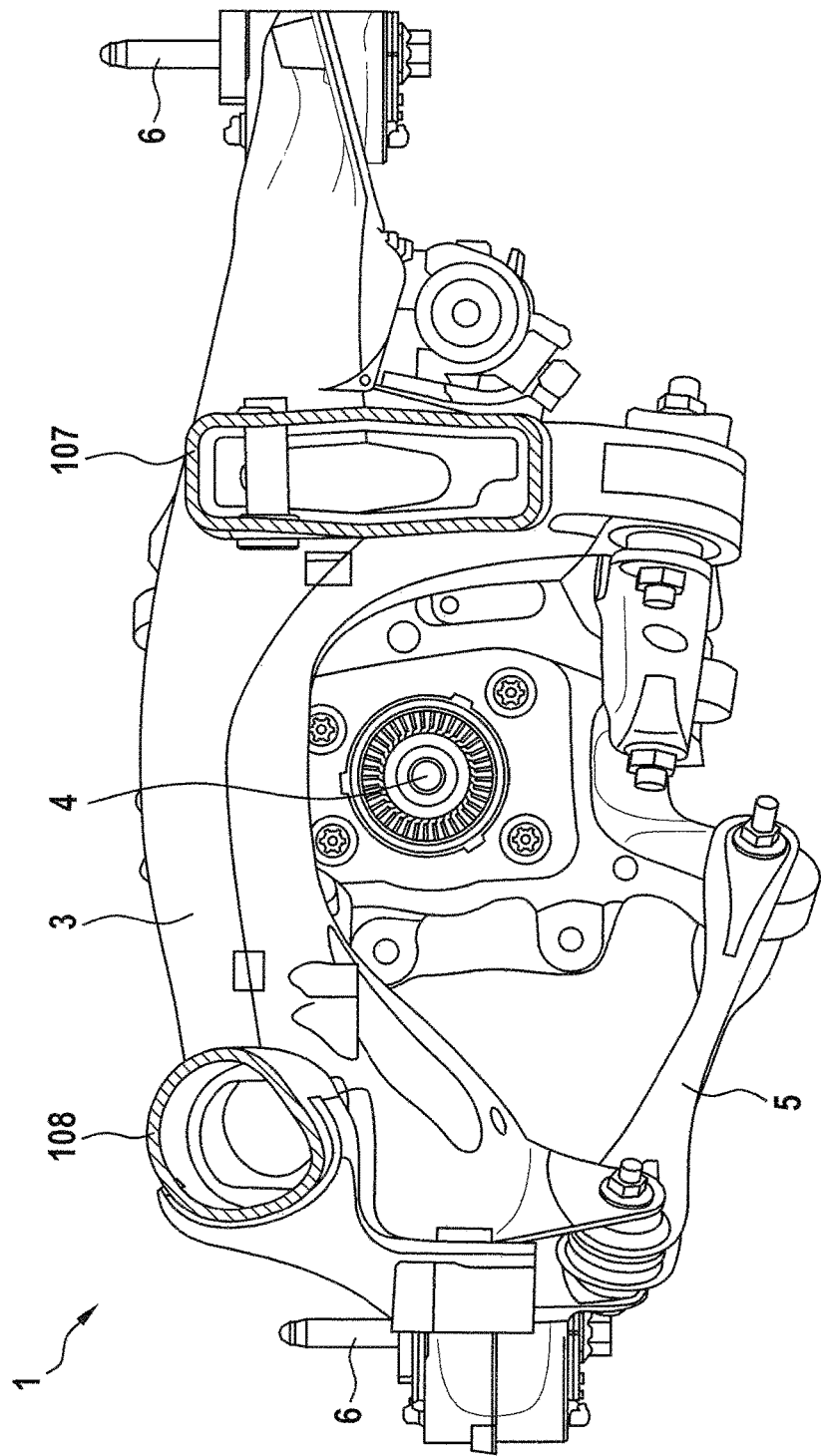
FIG. 2 shows a cross section of an axle support in accordance with the prior art.

FIG. 1 shows two cross members 107, 108 in accordance with the prior art for connecting the two longitudinal carriers 2, 3. FIG. 2 shows a cross section through an axle support in accordance with the prior art.

Figure 3:
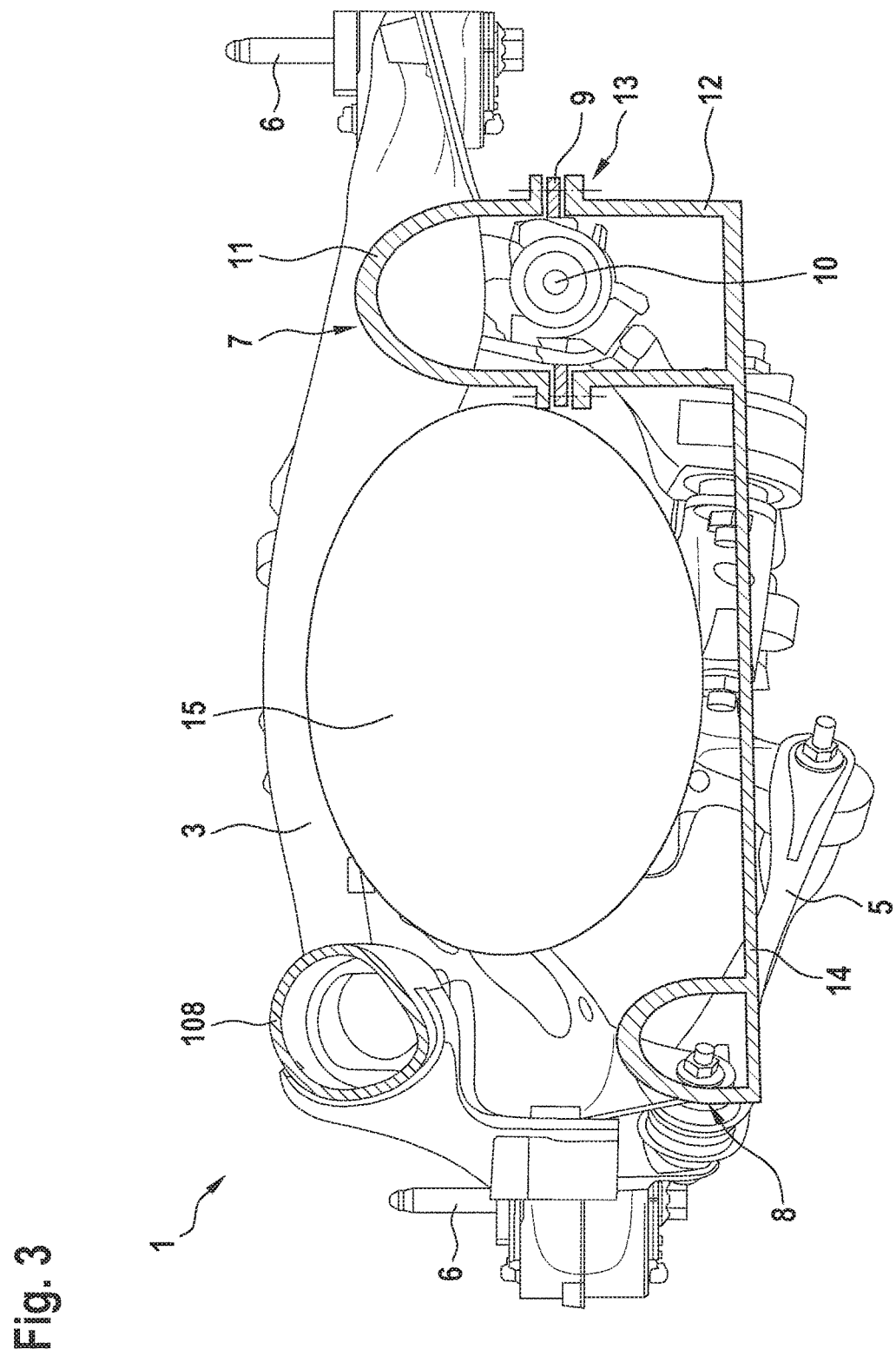
FIG. 3 shows a cross section of the axle support in accordance with one exemplary embodiment of the invention.

According to the invention, at least the rear cross member 107 is replaced by the construction which is shown in FIG. 3. This is indicated diagrammatically in FIG. 1 by way of the components 12 and 14.

FIGS. 1 and 3 show, furthermore, that the axle support 1 according to the invention has a holding device 9 which is connected by way of its two ends to the longitudinal carriers 2, 3. A constituent part 10 of an axle steering system is seated on the holding device 9. In the specific case, this is a hydraulic actuator of a rear axle steering system.

As a supplement to FIG. 1, FIG. 3 shows the construction according to the invention. In accordance with the cross section in FIG. 3, the cross member 107 in accordance with the prior art is replaced by the cross member 7 according to the invention. The cross member 7 is of two-shell construction and therefore includes a first shell 11 and a second shell 12. In the example which is shown, the second shell 12 is arranged below the first shell 11.

A cavity results between the two shells 11, 12, which cavity is utilized for receiving the holding device 9 with the constituent part 10.

The two shells 11, 12 are connected to one another via a plurality of screw connections 13 (shown schematically) such that they can be released without destruction.

It is provided, in particular, to utilize the further cross member 8 according to the invention which is shown in FIG. 3, and to connect said further cross member 8 to the second shell 12 of the cross member 7 via a shear area 14. Furthermore, FIG. 3 shows the cross member 108 in accordance with the prior art. The cross member 108 can additionally be utilized in the construction according to the invention.

The shear area 14 is plate-shaped and extends substantially in the horizontal plane. The shear area 14 can also be connected to the second shell 12 in an integrally joined manner. It is decisive that the shear area 14 is advantageously connected to the further cross member 8 such that it can be released without destruction. This results in the possibility of dismantling the second shell 12 together with the shear area 14 during servicing. As a result, both the cavity in the cross member 7 and the intermediate space between the cross member 7 and the further cross member 8 are satisfactorily accessible.

The space between the two cross members 7, 8 is advantageously utilized for integrating an electric machine 15. The electric machine 15 in turn serves for sole or assisted drive of the vehicle.

LIST OF DESIGNATIONS

1 Axle support
2 Left-hand longitudinal carrier
3 Right-hand longitudinal carrier
4 Wheel suspension system
5 Wheel control components (links)
6 Vehicle body attachment points 7 Cross member
8 Further cross member
9 Holding device
10 Constituent part
11, 12 Shells
13 Screw connection
14 Shear area
15 Electric machine
107 Cross member according to the prior art
108 Further cross member according to the prior art The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An axle support for a vehicle, comprising:
    a left-hand longitudinal carrier for fastening a left-hand wheel suspension system;
    a right-hand longitudinal carrier for fastening a right-hand wheel suspension system; and
    at least one cross member which connects the two longitudinal carriers;
    a further cross member; and
    a plate-shaped shear area,
    wherein
        the cross member is formed by way of two shells which are placed onto one another forming a cavity,
        the two shells are connected to one another such that they can be released without destruction, and at least one constituent part of an axle steering system is installed in the cavity between the two shells,
        the shear area is connected to the two cross members, and
        the connection to the further cross member is releasable without destruction.

2. The axle support as claimed in claim 1, wherein the constituent part of the axle steering system is an electric, pneumatic or hydraulic actuator.

3. The axle support as claimed in claim 1, further comprising:
    a holding device which is fastened to the two longitudinal carriers in the cavity, the constituent part of the axle steering system being fastened to the holding device.

4. The axle support as claimed in claim 2, further comprising:
    a holding device which is fastened to the two longitudinal carriers in the cavity, the constituent part of the axle steering system being fastened to the holding device.

5. The axle support as claimed in claim 1, wherein the two shells are screwed to one another.

6. The axle support as claimed in claim 1, wherein
    at least one of the two shells is fixedly connected directly to the two longitudinal carriers.

7. The axle support as claimed in claim 6, wherein both of the two shells are connected in each case directly to the two longitudinal carriers.

8. The axle support as claimed in claim 1, wherein
    the cross member has an overall length, and each of the two shells extends over at least 80% of the overall length.

9. The axle support as claimed in claim 8, wherein each of the two shells extends over 100% of the overall length.

10. The axle support as claimed in claim 1, wherein no wheel control components are fastened to at least one of the two shells.

11. The axle support as claimed in claim 10, wherein no wheel control components are fastened to a lower one of the two shells.

12. The axle support as claimed in claim 1, further comprising:
    an electric machine for driving the vehicle, the electric machine being arranged between the two longitudinal carriers.

13. The axle support as claimed in claim 1, further comprising:
    an electric machine for driving the vehicle, the electric machine being arranged between the two longitudinal carriers.

* * * * *